Patented Sept. 3, 1929.

1,726,635

UNITED STATES PATENT OFFICE.

WILLIAM CHITTENDEN TAYLOR, OF CORNING, NEW YORK, ASSIGNOR TO CORNING GLASS WORKS, OF CORNING, NEW YORK, A CORPORATION OF NEW YORK.

GLASS AND PROCESS OF DECOLORIZING AND FINING THE SAME.

No Drawing. Application filed May 11, 1926, Serial No. 108,414. Renewed August 4, 1928.

In Patent No. 1,414,715 granted to me on the 2nd day of May, 1922, I disclosed a process of increasing the ultra-violet absorption of a potash glass and of coloring the same by using cerium dioxide, preferably in the amount of three to six per cent, and manganese dioxide.

I have now discovered that cerium dioxide may be used with marked advantage in glass for purposes other than that of ultra-violet absorption. I have found that when cerium dioxide is added to glass in much smaller percentages than that specified in the above patent and in amounts not sufficient to cause appreciable coloration thereof, it tends to decrease the amount of manganese dioxide otherwise necessary for decolorizing purposes, thus effecting an appreciable saving of the latter.

I have also found that cerium dioxide when present in such small amount fulfills some of the functions of arsenic in glass, in that it is an oxidizing agent and is also an efficient fining agent for the removal of small bubbles and I propose to take advantage of this property of cerium dioxide and thus dispense with the use of arsenic which is commonly used for this purpose.

Furthermore the decolorizing efficiency of commercial manganese dioxide varies considerably, due probably to the presence of more or less of the lower oxides of manganese which have no decolorizing action and I have found that cerium dioxide when used in the aforementioned small amounts so changes these lower oxides as to render the entire manganese content available for decolorizing action, thereby making the poorer grades of manganese dioxide as effective as the more expensive grades and effecting a further saving in cost.

Moreover cerium dioxide produces the above-mentioned effects even in the absence of other oxidizing agents, such as niter, and I have found that a lime glass batch containing manganese dioxide as decolorizer and also containing cerium dioxide in the aforementioned amount, but containing no niter, will produce a colorless glass. Such a batch if it did not contain any cerium dioxide would be colored a distinct green by the iron which is normally present as an impurity in the batch materials and is not decolorized except by higher oxides of manganese which themselves are reduced when niter is lacking. Therefore, by addition of cerium dioxide, I am enabled to decrease the amount of niter ordinarily used in making such glasses or dispense with it entirely, thereby effecting a further saving in cost.

As an illustration of some of the glasses which fall within the scope of this invention I give the following compositions of glasses calculated from batches which I have melted:

|  | A | B |
|---|---|---|
|  | Per cent | Per cent |
| $SiO_2$ | 74.42 | 61.8 |
| $Na_2O$ | 18.13 | 13.2 |
| $Al_2O_3$ | .95 | .9 |
| $CaO$ | 6.25 |  |
| $PbO$ |  | 23.8 |
| $MnO_2$ | .06 | .08 |
| $CeO_2$ | .19 | .12 |

Composition A is a soda lime glass and composition B is a lead glass. Glases made according to these formulae would normally contain appreciable iron derived as an impurity from the batch materials or picked up from the refractories but the amount of manganese dioxide required for decolorization will be much less in these batches than would be the case were cerium dioxide not present. It is to be understood that the amount of manganese dioxide required to produce decolorization in glasses can only be stated approximately for it is well known to those skilled in the art that this amount depends upon the amount of iron present, as well as upon the conditions of melting, such as temperature and length of time of melting. When too much manganese dioxide is used the glass is colored pink. If a glass batch contains manganese dioxide just sufficient to decolorize it and produce a colorless glass when melted, and if a small amount of cerium dioxide, say, two-tenths of one per cent, which is insufficient in itself to cause coloration, be added to the batch and the whole be melted, the resulting glass will be colored pink, indicating an excess of manganese dioxide. Therefore, in the presence of cerium dioxide the amount of manganese dioxide required for decolorization may be materially decreased.

Generally speaking, the relative effect of cerium dioxide in intensifying the decolorizing effect of manganese dioxide in both lead and lime glasses has been found to be about 3; that is to say, by using .15% of cerium dioxide and a given quantity of manganese dioxide a decolorization was produced equal to that produced by three times the given quantity of manganese dioxide if used without cerium dioxide.

It should be pointed out that arsenic also has an intensifying effect on the decolorizing action of manganese dioxide though in much less degree than has cerium dioxide, but contrary to expectations arsenic does not add to or enhance the intensifying effect of the latter. On the contrary, arsenic nullifies the effect of cerium dioxide and should not be used in conjunction therewith. Since cerium dioxide can be used advantageously to replace arsenic as pointed out above, arsenic should be omitted when cerium dioxide is used in conjunction with manganese dioxide as a decolorizer.

In the foregoing description I have mentioned only cerium oxide, but certain other rare earth oxides, such as those of didymium and lanthanum, are also capable of intensifying the decolorizing action of manganese dioxide, though in less degree than cerium. Since the rare earth elements are separated only with great difficulty and are therefore quite expensive in the pure state, I prefer to use the impure mixture commonly known as "rare earth hydrates" which contains didymium, lanthanum and about 40% of cerium dioxide. Moreover, I do not wish to confine myself to the use of cerium dioxide or the rare earth hydrates, since any ceric salt or compound containing cerium in the higher valence will produce the same effect and falls within the scope of my invention.

Having thus fully described my invention what I claim and desire to secure by Letters Patent is:—

1. A substantially colorless glass containing manganese dioxide and cerium dioxide, the latter being present in quantities insufficient in itself to color the glass.

2. The process of decolorizing glass having an iron content otherwise sufficient to color the same, which consists in adding to a batch therefor a small quantity of cerium dioxide and a small quantity of manganese dioxide.

3. The process of intensifying the decolorizing effect of manganese dioxide in a glass containing iron impurities, which consists in adding to a batch therefor a quantity of cerium dioxide insufficient in itself to color the glass.

4. The process of decolorizing a glass containing iron impurities and of fining the same, which comprises the steps of adding to the glass batch manganese dioxide and cerium dioxide in quantities insufficient to color the glass and in then melting the batch.

5. The process of fining glass which comprises adding to a suitable batch therefor a quantity of cerium dioxide insufficient in itself to color the glass and then melting the batch.

6. The process of decolorizing glass having an iron content otherwise sufficient to color the same, which consists in adding to a batch therefor cerium dioxide equivalent in amount to not more than 1.5% of the finished glass, and a small quantity of manganese dioxide.

7. The process of decolorizing glass having an iron content otherwise sufficient to color the same, which consists in adding to a batch therefor such a quantity of ceric salt or compound containing cerium in the higher valence as will give to the finished glass a content of not more than 1.5% of cerium dioxide, and a small quantity of manganese dioxide.

8. The process of fining a colorless glass which comprises melting a batch containing a small percentage of cerium dioxide.

In testimony whereof I hereunto affix my signature.

WILLIAM CHITTENDEN TAYLOR.